United States Patent
Demaj et al.

(10) Patent No.: US 9,628,144 B2
(45) Date of Patent: Apr. 18, 2017

(54) METHOD FOR ESTIMATING A TIME INVARIANT TRANSMISSION CHANNEL, AND CORRESPONDING RECEIVER

(71) Applicant: STMICROELECTRONICS (ROUSSET) SAS, Rousset (FR)

(72) Inventors: Pierre Demaj, Nice (FR); Yoann Bouvet, Opio (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 15/053,264

(22) Filed: Feb. 25, 2016

(65) Prior Publication Data

US 2017/0012670 A1    Jan. 12, 2017

(30) Foreign Application Priority Data

Jul. 9, 2015    (FR) .................................. 15 56489

(51) Int. Cl.
| | |
|---|---|
| *H04L 5/00* | (2006.01) |
| *H04B 3/54* | (2006.01) |
| *H04L 25/02* | (2006.01) |
| *H04L 27/26* | (2006.01) |

(52) U.S. Cl.
CPC ......... *H04B 3/542* (2013.01); *H04L 25/0228* (2013.01); *H04L 27/2662* (2013.01)

(58) Field of Classification Search
CPC .. H04B 3/542; H04L 25/0228; H04L 27/2662
See application file for complete search history.

(56) References Cited

U.S. PATENT DOCUMENTS

| | | | |
|---|---|---|---|
| 6,314,131 B1* | 11/2001 | Roe ..................... | H04L 25/0232 370/342 |
| 6,924,763 B2* | 8/2005 | Poullin .................. | G01S 7/414 342/159 |
| 2003/0063596 A1 | 4/2003 | Arslan et al. | |
| 2010/0067629 A1* | 3/2010 | Gaddam ............. | H04L 27/2649 375/346 |

(Continued)

FOREIGN PATENT DOCUMENTS

| | | |
|---|---|---|
| JP | 2007258897 | 10/2007 |
| JP | 2009089146 A | 4/2009 |
| WO | 2014037066 | 3/2014 |

OTHER PUBLICATIONS

Demaj et al, U.S. Appl. No. 15/042,326, filed Feb. 12, 2016.

(Continued)

*Primary Examiner* — Dac Ha
(74) *Attorney, Agent, or Firm* — Slater Matsil, LLP

(57) ABSTRACT

A method is for processing an analog channel signal from a transmission channel. The method may include converting of the analog channel signal to a digital channel signal, and performing a channel estimation digital processing of the digital channel signal. The channel estimation digital processing may include for at least one frame, generating transfer functions of the transmission channel, the transfer functions respectively associated with reference symbols of the frame, and averaging processing of the transfer functions to generate an average transfer function. The method may include decoding of symbols of the frame following the reference symbols using the average transfer function.

21 Claims, 7 Drawing Sheets

(56) References Cited

U.S. PATENT DOCUMENTS

| | | | |
|---|---|---|---|
| 2010/0124289 A1* | 5/2010 | Yonge, III | H03F 1/3247 375/257 |
| 2012/0143553 A1* | 6/2012 | Feistel | H04R 3/04 702/109 |
| 2012/0195384 A1 | 8/2012 | Sato | |
| 2013/0051482 A1 | 2/2013 | Nassar et al. | |
| 2013/0170539 A1 | 7/2013 | Huang et al. | |
| 2014/0064348 A1* | 3/2014 | Braz | H04B 1/12 375/227 |
| 2014/0355621 A1 | 12/2014 | Katar et al. | |
| 2015/0280888 A1* | 10/2015 | Karsi | H04L 5/0073 370/329 |
| 2016/0285509 A1 | 9/2016 | Wallis | |

OTHER PUBLICATIONS

Bouvet et al, U.S. Appl. No. 15/042,429, filed Feb. 12, 2016.
Demaj et al, U.S. Appl. No. 15/042,509, filed Feb. 12, 2016.
Bogdanovic et al, "Improved least square channel estimation algorithm for OFDM based communication over power lines", The Mediterranean Journal of Computers and Networks, Jul. 2014, pp. 232-238.
Tunc, "LPTV-Aware Bit Loading and Channel Estimation in Broadband PLC for Smart Grid", May 2014, pp. 1-97.
Donlan, "Ultra-wideband narrowband interference cancellation and channel modeling for communications", Jan. 2005, pp. 1-113.

\* cited by examiner

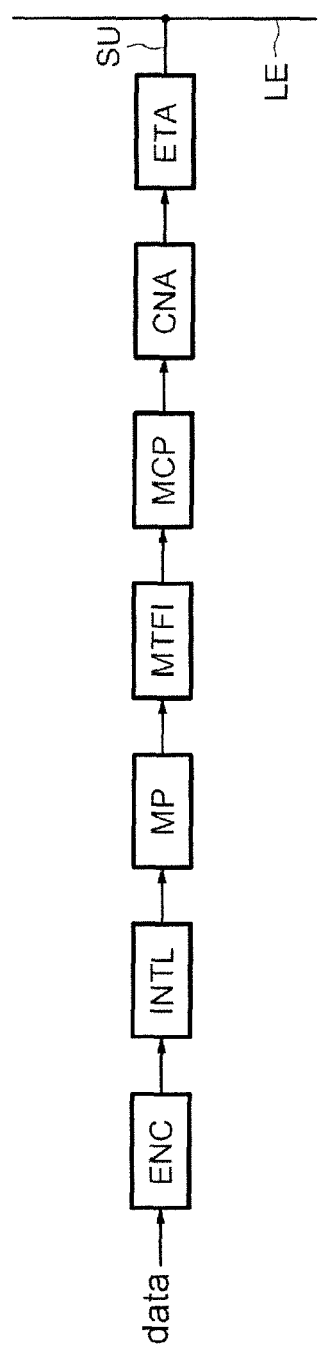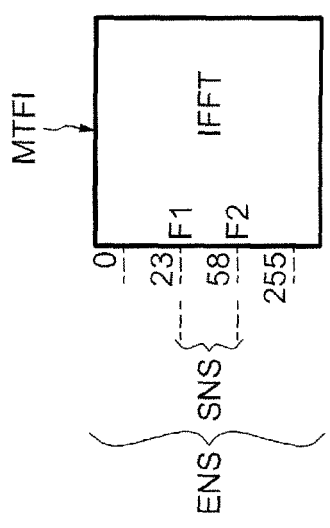

METHOD FOR ESTIMATING A TIME INVARIANT TRANSMISSION CHANNEL, AND CORRESPONDING RECEIVER

RELATED APPLICATION

This application is based upon prior filed copending French Application No. 1556489 filed Jul. 9, 2015, the entire subject matter of which is incorporated herein by reference in its entirety.

TECHNICAL FIELD

The present disclosure relates to a method for transmission of information over a transmission channel, and in particular, to transmission over a power line and related devices.

BACKGROUND

Power line communications (PLC) technology is aimed at transmitting digital data by utilizing the existing infrastructure of the electrical grid. It allows, in particular, remote reading of electric meters, exchanges between electric vehicles and the recharging terminals and also management and control of energy networks (smart grid). PLC technology incorporates, in particular, narrow band power line communication (N-PLC) which is generally defined as a communication over an electrical line operating at transmission frequencies of up to 500 KHz. N-PLC communication thus generally uses the frequency bands defined in particular by the European committee for electrotechnical standardization (CENELEC) or by the Federal Communications Commission (FCC). Thus, if the CENELEC A frequency band (3-95 kHz) is considered, the transmission frequencies are situated between 35.9375 and 90.625 KHz for the PLC-G3 standard.

The signals conveyed by PLC and received by the receiver result from a combination of several signals having followed within the transmission channel (the electrical line) several propagation routes or paths each having its own time delay and its own attenuation (the transmission channel is a multi-path transmission channel). The overall performance of a receiver depends greatly on the quality of its channel estimation, i.e. on the estimation of the transfer function of this channel. Contemporary receivers, compatible with the PLC-G3 standard, are suitable for performing a channel estimation when the latter is linear and time invariant (LTI: "Linear Time Invariant"), by using two orthogonal frequency-division multiplexing (OFDM) symbols to estimate the channel transfer function.

SUMMARY

Generally speaking, a method is for processing an analog channel signal from a transmission channel. The method may include converting of the analog channel signal to a digital channel signal, and performing a channel estimation digital processing of the digital channel signal. The channel estimation digital processing may include for at least one frame, generating a plurality of transfer functions of the transmission channel, the plurality of transfer functions respectively associated with a plurality of reference symbols of the at least one frame, and averaging processing of the plurality of transfer functions to generate an average transfer function. The method may include decoding of symbols of the at least one frame following the plurality of reference symbols using the average transfer function.

BRIEF DESCRIPTION OF THE DRAWINGS

FIGS. 1 to 7 are schematic diagrams of devices, according to the present disclosure.

DETAILED DESCRIPTION

Figure 3:
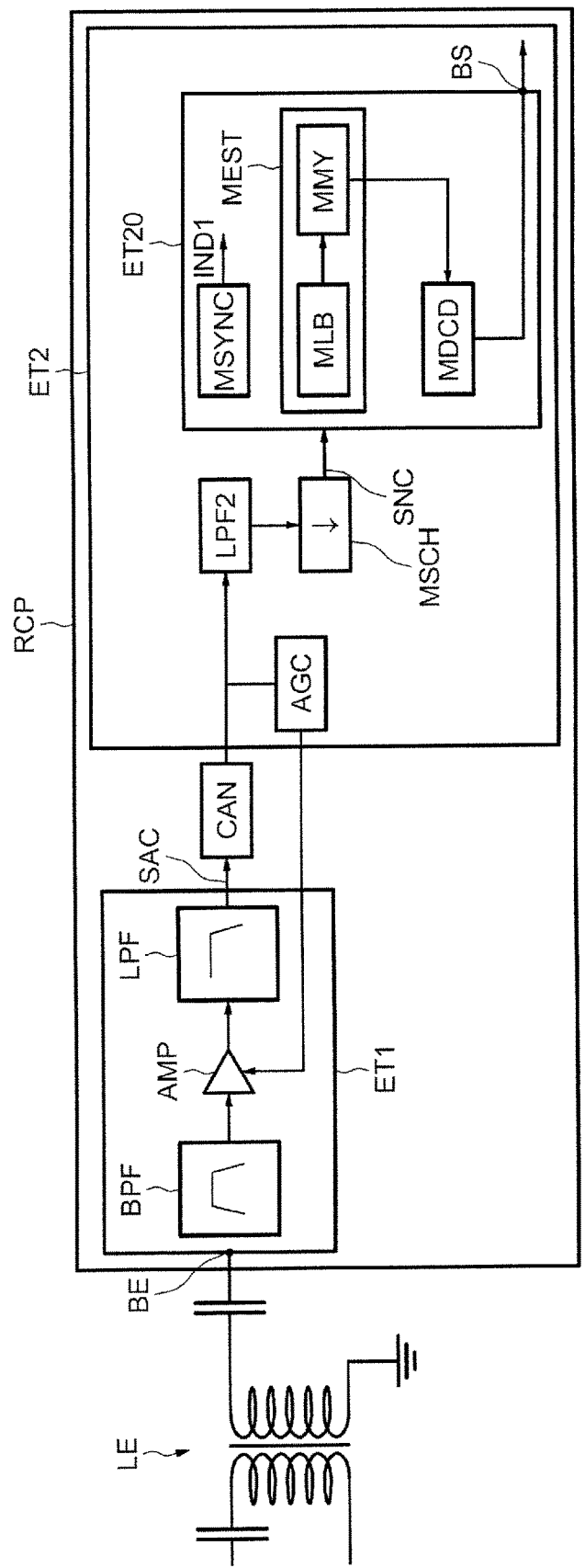

According to an embodiment, it is proposed to increase by several dB the decoding performance of a receiver compatible, in particular with the PLC-G3 standard and connected to a channel of the LTI type. According to one aspect, a method is for processing an analog channel signal deriving from a transmission channel (e.g., an electrical line, the signal then being conveyed by PLC). The analog channel signal conveys symbol frames, and the transmission channel is considered to be LTI for the entire duration of at least one frame. The method comprises an analog-digital conversion of the analog channel signal so as to obtain a digital channel signal, a channel estimation digital processing, and a decoding of symbols performed on the digital channel signal. The channel estimation digital processing comprises, for the at least one frame, a formulation of at least three transfer functions of the channel, which are respectively associated with at least three reference symbols of the at least one frame, and a processing for averaging the transfer functions to obtain an average transfer function. The decoding of the symbols of the at least one frame following the reference symbols is then performed using this average transfer function.

The number of symbols on the basis of which the channel is estimated is increased and an average of the transfer functions associated with these symbols is performed so as to use this average transfer function thereafter in the decoding of the symbols. This makes it possible to increase the signal-to-noise ratio of the average transfer function, which ultimately will lead to an increase in the decoding performance by several dB.

Even if the use of three reference symbols affords an improvement with respect to the specifications of the PLC-G3 standard, it may be helpful in practice to use a larger number of reference symbols to further improve the decoding performance. It may be also advantageous to use successive reference symbols.

In one embodiment, the channel estimation digital processing comprises, for the at least one frame, a formulation of M transfer functions respectively associated with M successive reference symbols of the at least one frame, M being greater than or equal to 3, and preferably considerably greater than 3, for example, greater than 10. The analog channel signal which will undergo the analog-digital conversion may be, for example, the analog signal directly deriving from the channel or else, as is generally the case, the analog signal delivered by an analog input stage (in particular comprising band pass filters, low-pass filters and an amplifier) connected to the transmission channel. The analog channel signal is, for example, compliant with the PLC-G3 standard.

In this case, the number M of reference symbols can be equal to 15 and then together extend over a duration equal to 10.42 ms (since each reference symbol has a duration equal to 0.695 ms). This total duration of 10.42 ms is slightly greater than half the period of the alternating current intended to flow on the electrical line (i.e. 20 ms for a frequency of 50 Hz). In the same manner, in countries where the mains frequency is 60 Hz, half the period of the carrier current is equal to 8.33 ms and the number M of reference symbols can be taken equal to 12. The channel is considered to be time invariant for the entire duration of the at least one frame.

Of course, the channel may be time invariant in the course of several frames, successive or not, and in this case, the various above-mentioned steps of the method are advantageously applied for each of these frames, the channel being considered, during the reception of each of these frames, to be time invariant for the entire duration of the frame considered. On the send side, the analog channel signal derives from a digital-analog conversion of an initial digital signal, and when the sampling frequency of the digital channel signal (on reception) is different from the sampling frequency of the initial digital signal (on emission), it is preferable to take account of this shift of sampling frequency (or "sampling frequency offset") to correct the transfer functions.

Thus, in one embodiment, the channel estimation digital processing comprises a formulation of M base transfer functions respectively associated with the M reference symbols of the frame received, and a processing for correcting these M base transfer functions with a phase shift corresponding to this shift of sampling frequency so as to obtain the M transfer functions. The received-frame reference symbols on the basis of which the various transfer functions will be determined are, for example, symbols of the received frame corresponding to known symbols of the transmitted frame and/or are decodable symbols that can be decoded without knowing the transfer function of the transmission channel.

Thus, in the case of the PLC-G3 standard, each received frame comprises a preamble followed by a header followed by a useful field. The reference symbols can comprise the symbols of the header of a frame, which are decodable without knowing the transfer function of the transmission channel since they are coded in a differential manner, as well as the two symbols of the useful field ("payload") of the frame which correspond to the two known symbols S1, S2 of the useful field of the transmitted frame.

It will therefore be noted here that although the PLC-G3 standard provides for only two known symbols, namely the symbols S1 and S2, as pilot symbols for the estimation of the transfer function of the channel, provision is advantageously made here to increase this number of pilot symbols by using the symbols of the header of a frame which are decodable without making it necessary to know the transfer function of the channel. It is then readily possible to refine the channel estimation and obtain several transfer functions which will be averaged thereafter. This being so, it would also have been possible to also use as reference symbols all or some of the known symbols of the preamble of a frame so as to further increase the value of M and thus improve the channel estimation. Moreover, each formulation of a transfer function associated with a decodable symbol received comprises a decoding of the symbol received, a re-encoding of this decoded symbol so as to obtain a re-encoded symbol, and a determination of the transfer function of the channel on the basis of the re-encoded symbol and of the decodable symbol received.

According to another aspect, a receiver may include an input stage intended to be connected to a transmission channel and configured to deliver an analog channel signal deriving from the transmission channel. The analog channel signal is intended to convey symbol frames, and the transmission channel is considered to be LTI for the entire duration of at least one frame. The receiver may include an analog-digital conversion stage for converting the analog channel signal so as to deliver a digital channel signal, and a stage for processing the digital channel signal comprising channel estimation means or a channel estimator and means for decoding symbols or a decoder.

The estimation means may comprise formulation means or a formulator configured to formulate, for the at least one frame, at least three transfer functions of the channel which are respectively associated with at least three reference symbols of the at least one frame, and an average calculator block configured to perform a processing for averaging the transfer functions obtained so as to obtain an average transfer function. The decoding means may be then configured to decode the symbols of the at least one frame following the reference symbols by using this average transfer function.

According to one embodiment, the formulation means may be configured to formulate, for the at least one frame, M transfer functions respectively associated with M successive reference symbols of the at least one frame, M being greater than or equal to 3. The analog channel signal may derive from a digital-analog conversion of an initial digital signal, and when the sampling frequency of the digital channel signal is different from the sampling frequency of the initial digital signal. The formulation means may be further configured to formulate M base transfer functions respectively associated with the M reference symbols of the frame received, and to correct these M base transfer functions with a phase shift corresponding to this shift of sampling frequency so as to obtain the M transfer functions. The reference symbols of the received frame can correspond to known symbols of the transmitted frame and/or be decodable symbols that can be decoded without knowing the transfer function of the transmission channel.

Additionally, the formulation means may be configured to formulate a transfer function associated with a decodable symbol received by a decoding of the symbol received, a re-encoding of this decoded symbol so as to obtain a re-encoded symbol and a determination of the transfer function of the channel on the basis of the re-encoded symbol and of the decodable symbol received. The signal can be modulated according to an OFDM modulation.

The transmission channel may be an electrical line, and the analog channel signal is intended to be conveyed by PLC. The analog channel signal can be compliant with the PLC-G3 standard. In this case, each received frame comprises a preamble followed by a header followed by a useful field, and the reference symbols can comprise the symbols of the header and two symbols of the useful field corresponding to two known symbols of the transmitted frame.

The modes of implementation and embodiments which will now be described are described within the context of a transmission of information by PLC compliant with the PLC-G3 standard, although the present disclosure is not limited to this type of application. Throughout what follows, each time that the PLC-G3 standard is cited, it will be assumed that the CENELEC A frequency band (3-95 kHz) is considered.

Referring initially to FIG. 1, an exemplary sender capable of transmitting a useful signal SU on an electrical line LE by PLC is now described. The transmission chain comprises, for example, an encoder ENC, such as a convolutional encoder, receiving the data to be transmitted from source coding means or a source code store. Interleaving means or an interleaver INTL are connected to the output of the encoder and are followed by "mapping" means or a mapper which transform the bits into symbols according to a transformation scheme dependent on the type of modulation used, for example, a modulation of binary phase-shift keying (BPSK) type or more generally a quadrature amplitude modulation (QAM) modulation. Each symbol contains modulation coefficients associated with carriers which will be modulated accordingly. The symbols are delivered as input to processing means or a processor MTFI intended to perform an inverse fast Fourier transform (IFFT) operation.

It will be noted here, referring more particularly to FIG. 2, that the modulated carriers form a subset SNS of carriers from among an available set ENS of carriers (which set corresponds to the size of the inverse Fourier transform). Thus, in the PLC-G3 standard, the size of the inverse Fourier transform is equal to 256 while the modulated carriers of the subset SNS lie between the ranks 23 and 58, this corresponding to a frequency band F1-F2 lying between 35.9375 and 90.625 KHz. The sampling frequency is here equal to 400 KHz leading to an inter-carrier spacing equal to 1.5625 KHz, this thereby rendering the frequencies orthogonal (i.e. OFDM modulation). The modulation coefficients associated with the unused carriers are equal to 0.

The OFDM signal in the time domain is generated as output from the processing means MTFI, and means or circuitry MCP add, to each OFDM symbol in the time domain, a cyclic prefix which is a copy at the head of the OFDM symbol of a certain number of samples situated at the end of this symbol. By way of example, in the PLC-G3 standard, the length of the cyclic prefix is 30 samples for a sampling frequency of 400 KHz. The signal is thereafter converted in a digital-analog converter CNA and then processed in a stage ETA, commonly referred to by the person skilled in the art by the designation "Analog Front End", where it undergoes in particular a power amplification, before being transmitted on the electrical line LE.

At reception, it is seen, by referring more particularly to FIG. 3, that here the receiver RCP comprises an analog input stage ET1 whose input terminal BE is connected to the electrical line LE. This analog input stage ET1 comprises in a conventional manner a band pass filter BPF, a low-pass filter LPF, and amplification means or an amplifier AMP. The output of the stage ET1 is connected to an analog-digital conversion stage CAN whose output is connected to the input of processing means or stage ET2.

The processing stage ET2 here comprises automatic gain control AGC means or a circuit making it possible to control the value of the gain of the amplification means AMP of the stage ET1. The signal SAC delivered as output from the analog stage ET1 and as input to the analog-digital conversion CAN stage designates an analog channel signal deriving from the transmission channel (electrical line) LE.

The processing stage ET2 also comprises a low-pass filter LPF2 followed, although this is not indispensable, by sub-sampling means or a sub-sampler MSCH. The sampling frequency of the signal upstream of the means MSCH is denoted as Fs while the sampling frequency of the signal at the output of the means MSCH is denoted as Fss.

The signal SNC output by the means MSCH then designates here a digital channel signal, which derives from the analog-digital conversion of the analog channel signal SAC, and on which in particular a synchronization processing, a channel estimation and decodings of symbols will be applied as will be seen in greater detail hereinafter. The channel estimation is performed once synchronization has been acquired. The frequency Fc designates the calculation frequency at which the various processing operations will be performed.

In the PLC-G3 standard, for example, the sampling frequency Fs specified is 400 KHz for an FFT size of 256. Although it would have been possible to perform all the operations of these various processing operations at a calculation frequency Fc equal to the sampling frequency Fs of 400 KHz, the fact of under-sampling the signal at a frequency Fss less than Fs and of performing all the operations at the calculation frequency Fc equal to Fss makes it possible to reduce the complexity of implementation of the processing stage and also makes it possible to perform a direct fast Fourier transform (FFT) processing having a reduced size with respect to the specified size of 256.

Figure 4:
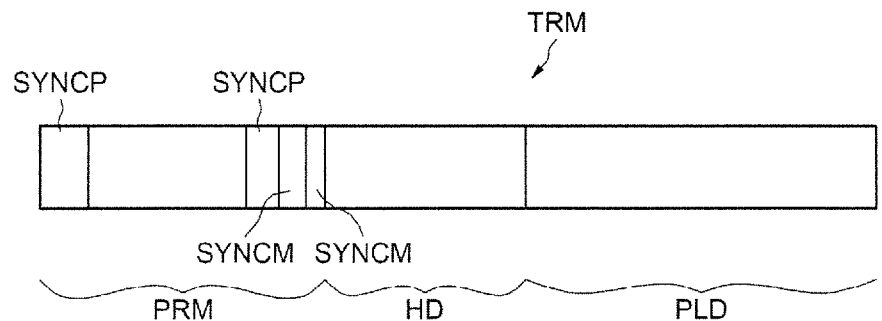

Before returning in greater detail to the various means and circuitry incorporated into the processing stage ET2, now referring more particularly to FIG. 4, the structure of a frame conveying symbols, for example, within the context of the PLC-G3 standard is now described. The frame received TRM comprises a preamble PRM comprising here eight known symbols SYNCP followed by a symbol of opposite phase SYNCM, itself followed by a half-symbol SYNCM. The frame TRM thereafter comprises a header HD followed by a useful field PLD containing symbols of useful data to be decoded and better known by the person skilled in the art as a "payload". The symbols of the header HD contain, in particular, control information for the decoding of the data of the field PLD as well as the number of bytes to be decoded in the field PLD.

The preamble PRM of the frame TRM allows the receiver to synchronize itself, i.e. to obtain an indication IND1 making it possible to retrieve the structure of the frame so as to be able to tag the start of the header HD. The transmission channel is a linear channel, i.e. that it behaves as a linear filter. It is considered here furthermore that for a considered frame of the channel is LTI for the entire frame. Stated otherwise, the characteristics of its transfer function are invariant throughout the frame.

In certain applications for which the electrical environment of the channel is known (being, for example, devoid of objects connected to an electrical line whose overall impedance is not predominated by one or more objects whose electrical characteristics generate a cyclo-stationary impedance, such as halogen lamps and/or voltage rectifiers), the transmission channel can be considered de facto to be time invariant in the course of the frames received. In other applications, the knowledge of the time invariant state of the channel in the course of the frame considered can result, for example, from a prior detection of the state of the channel, in particular but not limited to that described in the French patent application in the name of the Applicant, entitled "Procédé traitement d'un signal issu d'un canal de transmission, en particulier un signal véhiculé par courant porteur en ligne, et notamment l'estimation du canal, et récepteur correspondant", "Method for processing a signal deriving from a transmission channel, in particular a signal conveyed by PLC, and in particular the estimation of the channel, and corresponding receiver", and filed on the same day as the present patent application.

Now referring again to FIG. 3, it is seen that the processing stage ET2 comprises a sub-stage ET20 incorporating various means and logic circuitry that will now be described in a functional manner. These various means and logic circuitry can be achieved in a software manner within a microprocessor for example, then forming at least in part the sub-stage ET20.

Featuring in a conventional manner, among these various means, are synchronization means or a synchronizer MSYNC allowing the receiver to synchronize itself, i.e. to obtain the indication IND1 making it possible to retrieve the structure of the frame, so as to be able to tag the start of the header HD. These synchronization means can be of conventional structure known to the skilled person or else, as a variant, those incorporating the filtering means or a filter described in French patent application No. 1552588.

Featuring among the other means incorporated into the sub-stage 20 are channel estimation means NEST comprising formulation means MLB configured, as will be seen in greater detail hereinafter, to formulate, for the frame considered, several transfer functions of the channel that are respectively associated with several reference symbols of the frame, and an average calculator block MMY configured to perform a processing for averaging the transfer functions obtained so as to obtain an average transfer function. Decoding means MDCD of conventional structure known to the skilled person are then configured to decode the symbols of the frame following the reference symbols by using this average transfer function.

Figure 5:
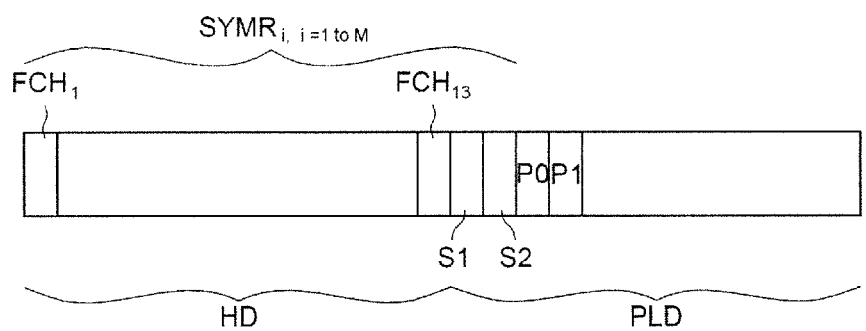

Referring now more particularly to FIG. 5, it is seen that the header HD of the frame received TRM comprises thirteen symbols $FCH_1$-$FCH_{13}$, which have been coded on emission in a differential manner and which are each referenced with respect to the preceding symbol. The frame TRM moreover comprises, at the start of the useful field PLD, two symbols corresponding to two known transmitted symbols S1, S2. That being so, for the sake of simplification these two symbols received will also be designated by S1 and S2. The thirteen symbols $FCH_i$ and the two symbols S1 and S2 here form M reference symbols $SYMR_i$ (M is equal to 15 in this example). These reference symbols will be used to formulate M transfer functions which will thereafter be averaged to obtain the average transfer function mentioned hereinabove.

Figure 6:
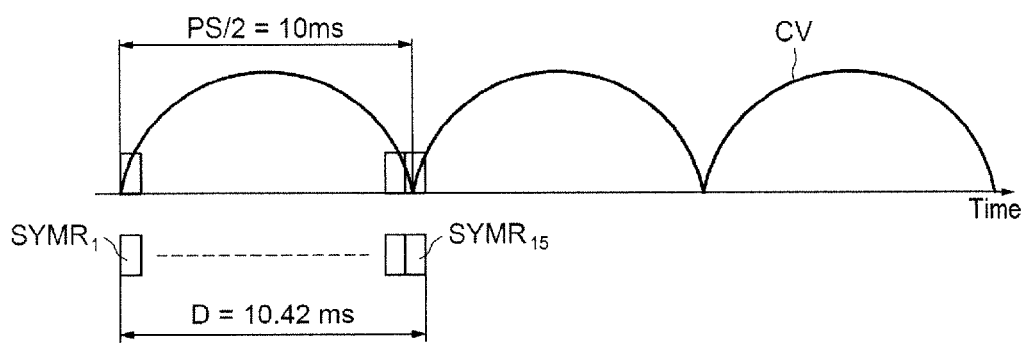

In FIG. 6, the curve CV schematically represents the periodic variations of the absolute value of the carrier signal flowing on the electrical line (alternating current or voltage) and, in this figure, PS/2 designates half the period of this carrier signal. Thus, for a current and voltage alternating at 50 Hz, PS/2 is equal to 10 ms. Since, in the PLC-G3 standard, each reference symbol $SYMR_i$ has a duration equal to 0.695 ms, all of the 15 reference symbols $SYMR_1$-$SYMR_{15}$ extend temporally over a total duration D equal to 10.42 ms which in the particular example described here is slightly greater than PS/2.

Stated otherwise, in the present case, half the period of the carrier signal is not an integer multiple of the duration of a reference symbol and it lies between 14 times 0.695 ms and 15 times 0.695 ms. This being so, the number M is not related to PS/2 and could optionally be greater than 15 in the case where other reference symbols could be used as, for example, at least some of the symbols of the preamble of the frame.

Now, referring more particularly to FIGS. 7 to 11, the channel estimation phase is described in more detail. This estimation phase is performed once the synchronization of the receiver has been acquired. This estimation phase is performed here at each frame reception for which the channel is time invariant, and now the processing operations performed in the course of one of these frames is now described.

Figure 7:
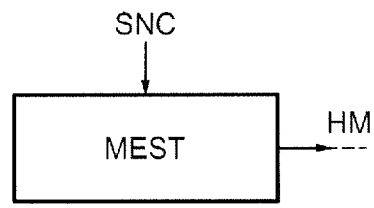
Figure 8:
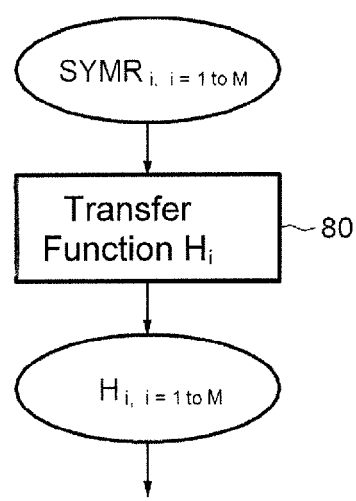
FIGS. 8-11 are flowcharts illustrating operations of the devices, according to the present disclosure.

As illustrated in FIG. 7, the channel estimation processing performed by the estimation means NEST on the basis of the digital channel signal SNC will make it possible to obtain an average channel transfer function HM which will be used for the decoding of the symbols following the last reference symbol. In this regard, as illustrated in FIG. 8, the formulation means MLB formulate firstly in step 80 a transfer function $H_i$ of the channel for each reference symbol $SYMR_i$.

More precisely, this transfer function $H_i$ is equal to the product of the reference symbol received $SYMR_i$ times the complex conjugate of the corresponding symbol transmitted by the sender on the transmission channel. In the present case, in compliance with the PLC-G3 standard, this transfer function $H_i$ is in fact a complex vector having 36 complex components corresponding respectively to the 36 tones of the symbol.

On completion of step 80, an initial sequence of M (=15) transfer functions $H_1$-$H_{15}$ is therefore obtained, associated respectively with the M (=15) reference symbols $SYMR_1$-$SYMR_{15}$. In the embodiment which has just been described, it was assumed that the send side sampling frequency was identical to the sampling frequency of the digital channel signal SNC. That being so, the sampling frequency of the digital signal SNC may be different from the initial digital signal formulated in the sender.

Figure 9:
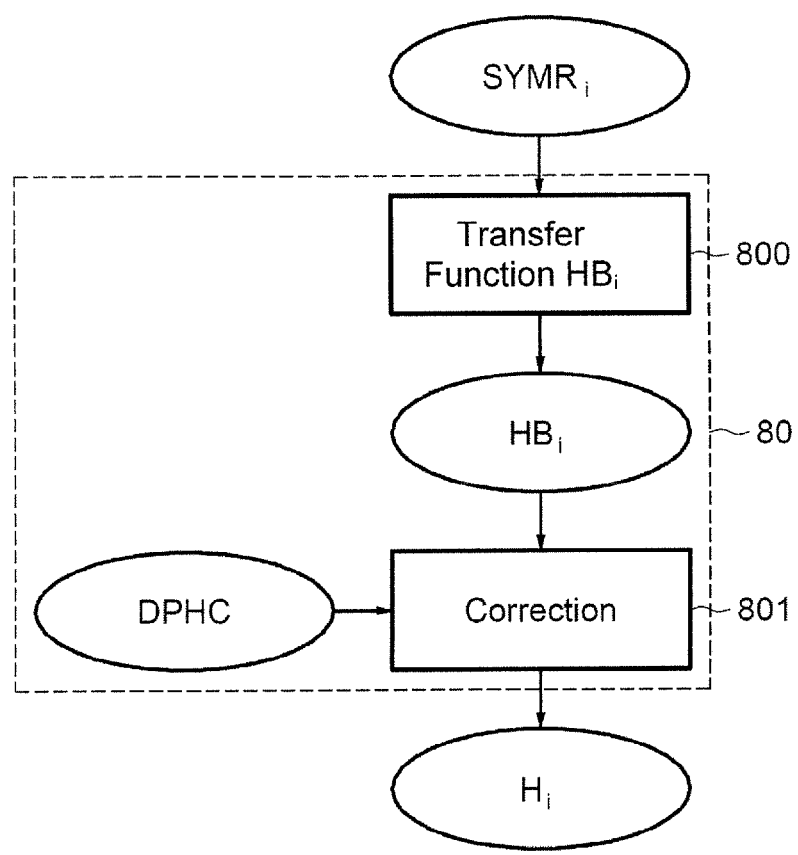

This case results in a shift of sampling frequency known to the person skilled in the art by the expression "sampling frequency offset" that has to be taken into account in the estimation of the transfer functions $H_i$. This is shown in FIG. 9. More precisely, base transfer functions $HB_i$ respectively associated with the reference symbols $SYMR_i$ are determined in step 800 in a manner analogous to what was described in step 80 of FIG. 8.

Next, the frequency shift ("sampling frequency offset") is estimated using, for example, two base transfer functions that are relatively far apart temporally, for example, the transfer functions $HB_1$ and $HB_{13}$. The resulting phase shift is then obtained by performing the product of the transfer function $HB_1$ times the complex conjugate of the transfer function $HB_{13}$, the whole divided by the number of symbols.

A phase shift correction DPHC is then obtained, which is applied in a step 801 to correct the M transfer functions $HB_i$ and to obtain the M transfer functions $H_i$. The estimation of a transfer function on the basis of each of the symbols S1 and S2 can be performed without difficulty since the transmitted symbols corresponding to the symbols S1 and S2 received are known.

On the other hand, such is not the case for the reference symbols of the header, i.e. the symbols $FCH_i$. Nonetheless, as indicated hereinabove, these symbols $FCH_i$ were coded at the sending end in a differential and particularly robust manner. Their decoding does not therefore require knowledge of the channel transfer function.

Figure 10:
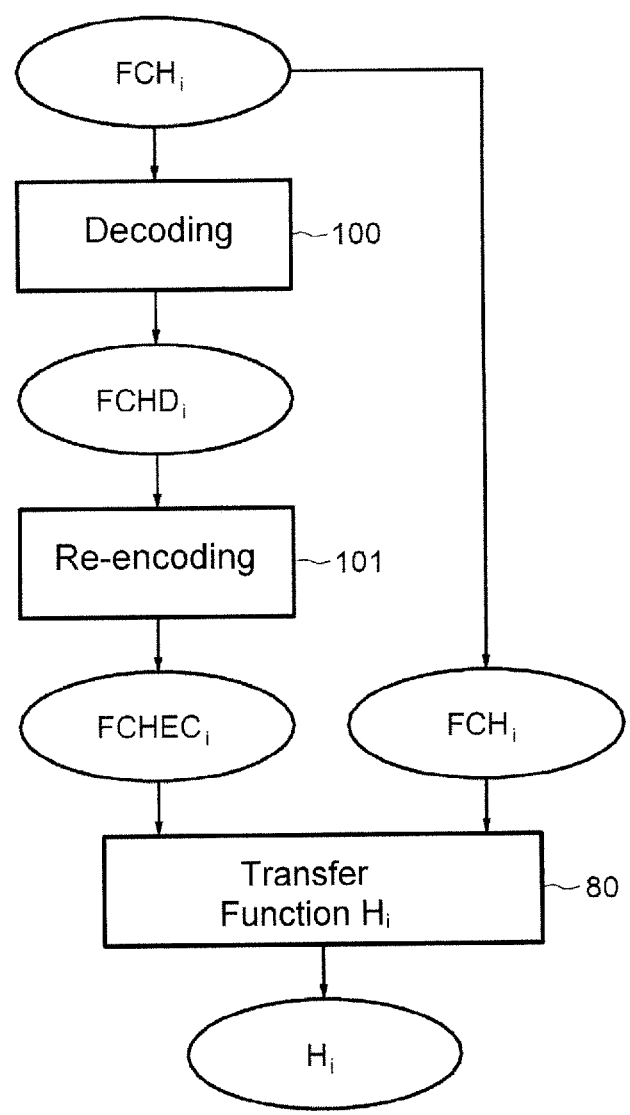

FIG. 10 illustrates an example of estimating a transfer function $H_i$ of the channel on the basis of the symbol $FCH_i$ of the header received. The decoding (step 100) of the symbol received $FCH_i$ is undertaken firstly. In this regard, the decoding means conventionally comprise means configured to remove the cyclic prefix from each symbol, followed by means configured to perform the direct fast Fourier transform FFT.

The decoding means also comprise demapping means or a demapper providing for each carrier a value of the corresponding modulation coefficient (bin). These demapping means are followed by a module configured to determine for each modulation coefficient an indication of confidence (soft decision) of the value. This module is conventional and known to the skilled person and uses, for example, an algorithm of the Log MAP type.

The decoding means also comprise deinterleaving means or a deinterleaver followed by a decoder, for example, a decoder of Viterbi type, followed by means or a circuit able to perform a parity check. The output of these means is connected to the sub-stage ET20 output terminal BS which is connected to the means forming the MAC layer of the receiver.

Since the various symbols $FCH_i$ are referenced with respect to the preceding symbols in the frame, it is necessary to decode all the symbols $FCH_i$ of the header with the decoding means mentioned hereinabove. Next, after verification that the parity check is correct, it is possible to obtain the various decoded symbols $FCHD_i$.

A re-encoding of each of these symbols $FCHD_i$ is then performed in step 101 by using a convolutional encoder, an interleaver and a mapping means analogous to the corresponding means ENC, INTL, MP illustrated in FIG. 1 for the sender part. It will be noted in this regard that we remain in the frequency domain.

Re-encoded symbols $FCHEC_i$ corresponding to the transmitted symbols are then obtained. It is then possible, in step 80 analogous to step 80 of FIG. 8, to obtain the transfer functions $H_i$ associated with the various symbols $FCH_i$ on the basis of these received symbols $FCH_i$ and of the re-encoded symbols $FCHEC_i$.

Figure 11:
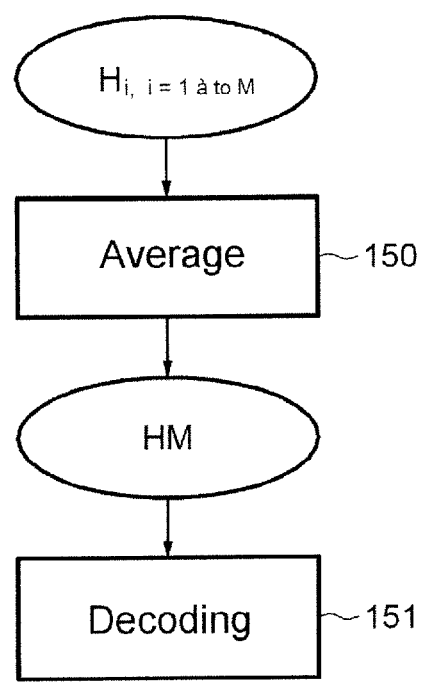

Instead of simply using, as mentioned in the PLC-G3 standard, the symbols S1 and S2 of a frame to estimate the transfer function of the channel, it is possible, as illustrated in FIG. 11, advantageously to use the M (M=15) transfer functions $H_i$ associated with the 15 reference symbols to calculate an average (step 150) thereof in the average calculator block MMY (FIG. 3) so as to obtain the average transfer function HM which will then be used for the decoding (step 151) of the symbols P0, P1, . . . of the useful field PLD of the frame. This transfer function HM is taken into account for the decoding, as is known by the person skilled in the art, at the level of the demapping means incorporated into the decoding means. The signal-to-noise ratio of the transfer function HM is thus significantly increased, this ultimately being manifested by an improvement of several dB in the decoding performance.

That which is claimed is:

1. A method for processing an analog channel signal from a transmission channel, the analog channel signal conveying symbol frames, the transmission channel being linear and time invariant for a duration of at least one frame, the method comprising:
   analog-digital converting of the analog channel signal to generate a digital channel signal;
   performing a channel estimation digital processing of the digital channel signal;
   the channel estimation digital processing comprising
      for the at least one frame, generating M transfer functions of the transmission channel respectively associated with M successive reference symbols, with M being greater than or equal to 3, and
      averaging processing of the M transfer functions to generate an average transfer function; and
   decoding symbols of the at least one frame following the M reference symbols using the average transfer function;
   wherein the analog channel signal is based upon a digital-analog conversion of an initial digital signal, and when a sampling frequency of the digital channel signal is different from a sampling frequency of the initial digital signal, then correcting the M transfer functions with a phase shift corresponding to a shift of the sampling frequency.

2. The method according to claim 1 wherein the M reference symbols of the at least one frame correspond to known symbols; and wherein the M reference symbols are decodable symbols to be decoded without knowing a transfer function of the transmission channel.

3. The method according to claim 2 wherein each generation of a transfer function associated with a decodable symbol received comprises:
   decoding the symbol received;
   re-encoding the decoded symbol to obtain a re-encoded symbol; and
   determining the transfer function of the transmission channel based upon the re-encoded symbol and the decodable symbol received.

4. The method according to claim 2 wherein each received frame comprises a preamble, a header following the preamble, a useful field following the header; wherein the M reference symbols are in the header; and wherein at least one symbol of the useful field corresponds to at least one known symbol of the at least one frame.

5. The method according to claim 1 wherein the analog channel signal is modulated according to an Orthogonal frequency-division multiplexing (OFDM) modulation.

6. The method according to claim 1 wherein the transmission channel comprises an electrical line; and wherein the analog channel signal is conveyed by power line communications.

7. The method according to claim 6 wherein the analog channel signal complies with the power line communications PLC-G3 standard.

8. A method for processing an analog channel signal from a transmission channel, the method comprising:
   converting of the analog channel signal to a digital channel signal;
   performing a channel estimation digital processing of the digital channel signal;
   the channel estimation digital processing comprising
      for at least one frame, generating M transfer functions of the transmission channel respectively associated with M successive reference symbols, with M being greater than or equal to 3, and
      averaging processing of the plurality of transfer functions to generate an average transfer function; and
   decoding symbols of the at least one frame following the M reference symbols using the average transfer function;
   wherein the analog channel signal is based upon a digital-analog conversion of an initial digital signal, and when a sampling frequency of the digital channel signal is different from a sampling frequency of the initial digital signal then correcting the M transfer functions with a phase shift corresponding to a shift of the sampling frequency.

9. A receiver comprising:
   an input stage to be coupled to a transmission channel and configured to deliver an analog channel signal from the transmission channel, the analog channel signal conveying symbol frames;
   an analog-digital converter configured to convert the analog channel signal to a digital channel signal; and
   a processor configured to
      perform a channel estimation digital processing of the digital channel signal, for at least one frame, generate M transfer functions of the transmission channel respectively associated with M successive reference symbols, with M being greater than or equal to 3, average the plurality of transfer functions to generate an average transfer function, and decode symbols of the at least one frame following the M reference symbols using the average transfer function, wherein the analog channel signal is based upon a digital-analog conversion of an initial digital signal, and when a sampling frequency of the digital channel signal is different from a sampling frequency of the initial digital signal then correcting the M transfer functions with a phase shift corresponding to a shift of the sampling frequency.

10. The receiver according to claim 9 wherein the transmission channel is linear and time invariant for a duration of the at least one frame.

11. The receiver according to claim 9 wherein the M reference symbols of the at least one frame correspond to known symbols; and wherein the M reference symbols are decodable symbols to be decoded without knowing a transfer function of the transmission channel.

12. The receiver according to claim 11 wherein each generation of a transfer function associated with a decodable symbol received comprises:
 decoding the symbol received;
 re-encoding the decoded symbol to obtain a re-encoded symbol; and
 determining the transfer function of the transmission channel based upon the re-encoded symbol and the decodable symbol received.

13. The receiver according to claim 11 wherein each received frame comprises a preamble, a header following the preamble, a useful field following the header; wherein the M reference symbols are in the header; and wherein at least one symbol of the useful field corresponds to at least one known symbol of the at least one frame.

14. The receiver according to claim 9 wherein the analog channel signal is modulated according to an Orthogonal frequency-division multiplexing (OFDM) modulation.

15. The receiver according to claim 9 wherein the transmission channel comprises an electrical line; and wherein the analog channel signal is conveyed by power line communications.

16. The receiver according to claim 15 wherein the analog channel signal complies with the power line communications PLC-G3 standard.

17. An electronic device comprising:
 an input stage to be coupled to a transmission channel and configured to deliver an analog channel signal from the transmission channel, the analog channel signal conveying symbol frames;
 an analog-digital converter configured to convert the analog channel signal to a digital channel signal; and
 a processor configured to
  perform a channel estimation digital processing of the digital channel signal,
  for at least one frame, generate M transfer functions of the transmission channel respectively associated with M successive reference symbols, with M being greater than or equal to 3, and
  decode symbols of the at least one frame following the M reference symbols based upon the M transfer functions,
  wherein the analog channel signal is based upon a digital-analog conversion of an initial digital signal, and when a sampling frequency of the digital channel signal is different from a sampling frequency of the initial digital signal then correcting the M transfer functions with a phase shift corresponding to a shift of the sampling frequency.

18. The electronic device according to claim 17 wherein the transmission channel is linear and time invariant for a duration of the at least one frame.

19. The electronic device according to claim 17 wherein the M reference symbols of the at least one frame correspond to known symbols; and wherein the M reference symbols are decodable symbols to be decoded without knowing a transfer function of the transmission channel.

20. The electronic device according to claim 17 wherein the transmission channel comprises an electrical line; and wherein the analog channel signal is conveyed by power line communications.

21. The electronic device according to claim 20 wherein the analog channel signal complies with the power line communications PLC-G3 standard.

* * * * *